3,321,325
LIQUID ROSIN SIZE CONTAINING FORTIFYING HYDROCARBONS

Rufus Noel Wisenbaker, Valdosta, Ga., and Lucius Havington Wilson, Westfield, N.J., assignors to American Cyanamid Company, Stamford, Conn., a corporation of Maine
No Drawing. Filed Nov. 9, 1966, Ser. No. 592,993
10 Claims. (Cl. 106—239)

This is a continuation-in-part of our application Ser. No. 244,288 filed on Dec. 13, 1962.

The present invention relates to the treatment of liquid rosin size to improve its efficiency for papermaking purposes.

Present-day rosin of size-making grade is manufactured by a process in the course of which the rosin is stripped of substantially all of its content of volatile organic matter.

This is generally accomplished by maintaining the rosin at a temperature in excess of about 200° C. (in the range of 200°–300° C.), until these volatile components have distilled off, so that the rosin has substantially no content of volatile organic matter. In this process vacuum or steam injection may be used to assist the separation; cf. Watkins U.S. Patent No. 2,887,475; Wilson U.S. Patent No. 2,909,514; and Bonzagni U.S. Patent No. 2,995,483.

Fluid rosin size is an aqueous dispersion of a rosin (or a mixture of rosins) which has been saponified (neutralized) to the extent of at least 75% with an alkali metal alkali, the amount of water being predetermined so that the product contains more than 60% (usually 60%–80%) rosin size solids by weight. The previously known sizes of this solids content and extent of neutralization have been of high viscosity even at normal storage temperature (160° F.) and hence have been usually termed "paste rosin size." More recently, rosin size of this solids content has been developed which is fluid at lower temperatures, and is made by use of potassium hydroxide or carbonate as partial or sole saponifying agent and potassium chloride and alcohol as fluidifying assistants. Since all such sizes are of pumpable viscosity at 160° F., they are hereinafter termed "liquid rosin size."

The discovery has now been made that the efficiency of liquid rosin size which contains substantially no organic matter which is volatile at 200° C. is improved when a small amount of a normally liquid, steam-distillable cyclic hydrocarbon is incorporated into the size.

The invention has the following advantages.

(1) It is not costly. The efficiency of size has been increased by as much as 55% at the cost of about 3% by weight of a cyclic hydrocarbon. Suitable cyclic hydrocarbons are readily and cheaply available.

(2) It does not involve any major change. The process does not require any significant change in the process of saponifying the rosin, or in the manner in which the size is utilized in the manufacture of paper. The hydrocarbon material can be satisfactorily incorporated in the size by simple stirring.

(3) The hydrocarbons used vaporize with the water as the wet cellulosic web is dried. The invention thus does not cause an impurity to be present in the ultimate paper sheet.

More in detail, according to the invention, a rosin which has substantially no content of organic matter volatile at 200° C. is saponified with aqueous alkali-metal alkali-solution to form a liquid rosin size, and a small amount of a normally liquid, steam-distillable cyclic hydrocarbon is mixed therewith as agent which improves the efficiency of the size. The size may then be shipped or used in the manufacture of paper.

The rosins which may be used for this purpose include gum rosin, wood rosin and tall oil rosin, and the rosin may contain a small amount of one or more fortified rosins (rosin which has been reacted with maleic anhydride, fumaric acid, saliginin, parafolmaldehyde, etc.). The amounts of water and alkali used in the saponification are predetermined so that generally the liquid contains more than 50% solids by weight, and so that generally more than 75% of the rosin is saponified.

The cyclic hydrocarbons suitable for use in the present invention are steam-distillable and rosin-soluble, that is, they volatilize when steam is blown therethrough with formation of a distillate consisting of water and the cyclic hydrocarbon, and they dissolve at least to the extent of 5% by weight in molten tall oil or gum or wood rosin. Preferred hydrocarbons have boiling points between 80° C. and 180° C. Cyclic hydrocarbons suitable for the practice of the present invention include limonene, $\alpha$-terpinene, $\gamma$-terpinene, $\alpha$-pinene, $\beta$-pinene, benzene, toluene, xylene, cyclohexane, cycloheptene, and cymene, and mixtures thereof.

The optimum amount of cyclic hydrocarbon to be added to the rosin size varies from instance to instance and is generally most conveniently determined by a series of laboratory trails, as shown in Example 2 below. We have found that as little as 1% of the hydrocarbon, based on the weight of rosin size solids, produces a perceptible improvement in the sizing obtained, so that evidently there is no amount, however small, which will not produce at least some benefit. A large amount, up to 15% or more on the weight of size solids, is beneficial. However, greatest benefit occurs when the weight of the cycle hydrocarbon is between about 2% and 5% to 10% of the dry weight of the sizing solids in the size, so that this range is preferred.

The cyclic hydrocarbon can be mixed into the size by use of ordinary agitation, such as is afforded by a propeller stirrer. The cyclic hydrocarbons are non-reactive with rosin and with rosin size, and evidently either emulsify in or dissolve in the size. Homogenization of the size does not appear to be necessary.

The cyclic hydrocarbon can be introduced into the size at any convenient point. Thus the cyclic hydrocarbon can be introduced during size-making step, as when rosin is saponified with sodium hydroxide solution in a closed loop reactor wherein agitation and emulsification are provided by a centrifugal pump, as disclosed in Anderson et al. U.S. Patent No. 2,842,453. In such process the hydrocarbon can be advantageously introduced through the shaft of the centrifugal pump, so that it is introduced into the size as it is formed. Alternatively, the cyclic hydrocarbon can be introduced into pre-formed finished size having a normal solids content of 60%–80%, or it may be introduced into the size after it has been diluted with water preparatory to use.

The cyclic hydrocarbon may be added to pre-formed size having a temperature in the customary range of 50°–100° C.

The rosin size of the present invention is employed in customary manner as agent for the manufacture of sized paper. The presence of the cyclic hydrocarbon in the size does not require any change in an established method of use of size. The size may be applied by standard beater addition or tub sizing methods. While the method of use is the same, it will be found that smaller amounts of size can be used to achieve a given level of sizing.

The size may contain the usual materials heretofore found in small amount in rosin size, for example, emulsified wax as extender, pentachlorophenol and other similar agents as inhibitors of the growth of microorganisms, a cationic resin as fortifying agent, and potassium chloride, sodium acetate or a lower alkanol as fluidifying agent.

The invention will be further described by reference to the examples which follow. The examples constitute preferred embodiments of the invention and are not to be construed as limitations thereon.

Example 1

The following illustrates the improvements in efficiency which is effected by addition of a variety of steam-distillable rosin-soluble cyclic hydrocarbons to a liquid rosin size which has substantially no content of volatile organic matter.

The rosin size used is commercially fortified tall oil rosin size, prepared from tall oil rosin having a reacted content of about ⅙ mol of maleic anhydride. This size has substantially no content of organic matter volatile at 200°–300° C. It contains 77% total solids by weight and 18% of free rosin based on the total weight of the rosin therein and has a temperature of 160° F. Samples of the size are taken and to these are added steam-distillable cyclic hydrocarbons as shown in the table below. The hydrocarbons are mixed by hand stirring into the samples of size. The samples are then tested to determine their comparative sizing efficiency. A standard laboratory method is used, as follows:

Cellulose papermaking fibers (50% bleached hardwood kraft and 50% bleached pine kraft pulp beaten to a Canadian standard freeness of 480 ml.) are suspended at 0.6% consistency in water containing approximately 100 p.p.m. of dissolved sulfate ions. Before use, the sizes are diluted to 10% solids by addition of water and are tested by adding 2% of each (size solids based on the dry weight of the papermaking fibers) to aliquots of this pulp.

The total alkalinity (determined by titration) of the pulps is adjusted to 30 p.p.m. by addition of sodium hydroxide or hydrochloric acid as required. Papermaker's alum at 10% concentration is then added to each aliquot in amount equivalent to 2% of the dry weight of the fibers.

The presence of the hydrocarbon material does not increase the tendency of the size to foam.

Handsheets are prepared from the aliquots by standard laboratory method at a basis weight of 200 lb. (25″ x 40″/500 sheets) and are dried for three minutes at 240° F. Sizing is determined by penescope using 20% lactic acid solution at a temperature of 100° F. and a head of 12″.

Results are as follows:

| Run No. | Steam-Distillable Cyclic Hydrocarbon | | Sizing (Lactic Acid) | |
|---|---|---|---|---|
| | Name | Percent Added [1] | Sec. | Percent Incr. |
| 1 | Control | None | 1,149 | |
| 2 | d,l-Limonene | 3 | 1,487 | 29.4 |
| 3 | α-Terpinene | 3 | 1,633 | 42.9 |
| 4 | γ-Terpinene | 3 | 1,514 | 31.8 |
| 5 | α-Pinene | 3 | 1,548 | 33.7 |
| 6 | β-Pinene | 3 | 1,568 | 36.4 |
| 7 | Benzene | 3 | 1,497 | 30.2 |
| 8 | Cymene | 3 | 1,618 | 40.8 |

[1] Based on the weight of rosin size solids.

Although the wet webs during drying smell of the added cyclic hydrocarbons, the dried paper in each instance is substantially odorless, showing that substantially all of the hydrocarbon evaporates during the drying.

Repetition of the foregoing process using 3% of kerosene in one instance and 3% of white paraffin oil in another instance (both being non-cyclic hydrocarbons) results in paper having no better sizing (in the case of the kerosene) and 5.1% less sizing (in the case of the paraffin oil) than the control.

Example 2

The following illustrates the effect of the amount of added cyclic hydrocarbon on the efficiency of the size.

The procedure of Example 1 is repeated except that d,l-limonene is used as the cyclic hydrocarbon, which is added in increasing amounts, as shown in the table below.

| Run No. | Steam-Distillable Cyclic Hydrocarbon | | Sizing (Lactic Acid) | |
|---|---|---|---|---|
| | Name | Percent Added [1] | Sec. | Percent Incr. |
| 1 | Control | None | 1,148 | |
| 2 | Limonene | 1 | 1,339 | 16.6 |
| 3 | do | 3 | 1,471 | 28.2 |
| 4 | do | 5 | 1,497 | 30.4 |
| 5 | do | 7 | 1,417 | 23.5 |
| 6 | do | 10 | 1,389 | 20.9 |
| 7 | do | 12 | 1,352 | 17.7 |
| 8 | do | 15 | 1,137 | −0.96 |

[1] Based on the weight of rosin size solids.

A plot of these results shows that the peak values (the values above 1400 seconds) were obtained by the use of between 2% and 10% of the cyclic hydrocarbon.

Example 3

The following illustrates the effect of the invention on an unfortified rosin size.

Samples of an unfortified gum rosin size containing no volatile oils (prepared by saponifying a gum rosin which had been heated for 30 minutes at 200° C.–250° C.) are treated with d,l-limonene and are tested as described in Example 1.

Results are as follows:

| Run No. | Percent Limonene Added [1] | Sizing (Lactic Acid) | |
|---|---|---|---|
| | | Sec. | Percent Incr. |
| 1 | None | 815 | |
| 2 | 1 | 908 | 11.4 |
| 3 | 3 | 1,233 | 51.4 |
| 4 | 5 | 1,229 | 50.8 |
| 5 | 10 | 1,123 | 50.1 |

[1] Based on the weight of rosin size solids.

Example 4

The following illustrates the effect of d,l-limonene on rosin size prepared from gum rosin (which had been heated for 30 minutes at 200° C.–250° C.) and fortified by a reacted content of about ⅙ mol of maleic anhydride. The general procedure of Example 1 is followed. An odorless paper is obtained.

| Run No. | Percent Limonene Added [1] | Sizing (Lactic Acid) | |
|---|---|---|---|
| | | Sec. | Percent Incr. |
| 1 | None | 1,432 | |
| 2 | 1 | 1,709 | 16.2 |
| 3 | 2 | 1,761 | 23.2 |
| 4 | 3 | 2,216 | 54.6 |

[1] Based on the weight of rosin size solids.

Example 5

The following illustrates the effectiveness of α-pinene on an all-potassium size.

The size is prepared by completely neutralizing tall oil rosin with aqueous potassium hydroxide of about 35% strength, and adding 2% of potassium chloride as fluidifying agent. The solids content of the resulting size is adjusted to 70% by addition of water.

Into a portion of this size at 160° F. is manually stirred 3% of α-pinene based on the weight of the solids in the size; the pinene emulsifies rapidly in the size.

The water-repellence of the two portions are determined by making handsheets containing the sizes by the method of Example 1, and noting the time for drops of water placed on each sheet to be absorbed. The sheets containing the pinene-containing size resist absorption of the water better than the other sheets.

*Example 6*

100 g. of Example 1 is diluted to 7.7% solids by addition of sufficient water at 25° C. to make 1000 cc. There is then added with gentle hand stirring (spatula) 2.3 g. of α-pinene. The pinene emulsifies readily, and the resulting size is fortified as to its sizing properties.

We claim:

1. A process of treating a liquid rosin size consisting essentially of an aqueous dispersion more than 60% by weight whereof is a rosin which is more than 75% saponified with an alkali metal alkali, said size having substantially no content of organic matter volatile at 200° C., which comprises incorporating in said size a small but effective amount, less than 15% based on the weight of rosin size solids in said size, of a normally liquid, steam-distillable cyclic hydrocarbon as agent improving the efficiency of said size.

2. A process according to claim 1, wherein the size is maleated tall oil rosin size.

3. A process according to claim 1 wherein the cyclic hydrocarbon is a terpene hydrocarbon.

4. A process according to claim 1 wherein the cyclic hydrocarbon is d,l-limonene.

5. A process according to claim 1 wherein the cyclic hydrocarbon is cymene.

6. A process according to claim 1 wherein the cyclic hydrocarbon is α-terpinene.

7. A process according to claim 1 wherein the cyclic hydrocarbon is β-pinene.

8. A process according to claim 1 wherein the cyclic hydrocarbon is a cyclic aromatic hydrocarbon.

9. A process according to claim 1 wherein the cyclic hydrocarbon is benzene.

10. A process of manufacturing a liquid rosin size according to claim 1 which comprises saponifying with aqueous alkali metal alkali solution a rosin having substantially no content of organic matter which is volatile at 200° C. to form a liquid rosin size, the amount of said alkali being sufficient to saponify said rosin at least to the extent of 75% and the amount of water in said solution being sufficient to provide a fluid size of at least 50% solids by weight, and mixing with said size a small but effectve amount, less than 15% of the rosin size solids in said size, of a normally liquid, steam-distillable cyclic hydrocarbon as agent improving the efficiency of said size.

References Cited by the Examiner

UNITED STATES PATENTS

| | | | |
|---|---|---|---|
| 1,997,366 | 4/1935 | Kern | 162—180 XR |
| 2,802,813 | 8/1957 | Maguire et al. | 260—93.3 |
| 2,846,328 | 8/1958 | Strazdins | 106—239 |
| 3,193,449 | 7/1965 | Aldrich et al. | 162—180 |

FOREIGN PATENTS 633,332  12/1949  Great Britain.

OTHER REFERENCES

Summers et al.: Paper Size From Pine Oleo Resin. In I+E. C. Product and Research Development, ed. by American Chemical Society, vol. I, March 1962, pages 56–59.

ALEXANDER H. BRODMERKEL, *Primary Examiner.*

J. B. EVANS, *Assistant Examiner.*